United States Patent
Deschamps et al.

(10) Patent No.: US 12,030,492 B2
(45) Date of Patent: Jul. 9, 2024

(54) METHOD AND DEVICE FOR DETERMINING A DECELERATION SETPOINT VALUE OF AN AUTONOMOUS VEHICLE

(71) Applicant: PSA AUTOMOBILES SA, Poissy (FR)

(72) Inventors: Vincent Deschamps, Malakoff (FR); Jean-Baptiste Braconnier, Palaiseau (FR); Claire Belle, Seloncourt (FR); Eric Favreau, Masevaux (FR)

(73) Assignee: STELLANTIS AUTO SAS, Poissy (FR)

( * ) Notice: Subject to any disclaimer, the term of this patent is extended or adjusted under 35 U.S.C. 154(b) by 0 days.

(21) Appl. No.: 18/264,924

(22) PCT Filed: Jan. 20, 2022

(86) PCT No.: PCT/FR2022/050106
§ 371 (c)(1),
(2) Date: Aug. 9, 2023

(87) PCT Pub. No.: WO2022/180315
PCT Pub. Date: Sep. 1, 2022

(65) Prior Publication Data
US 2024/0034316 A1   Feb. 1, 2024

(30) Foreign Application Priority Data
Feb. 23, 2021   (FR) ...................................... 2101722

(51) Int. Cl.
*B60W 30/14*   (2006.01)
*B60W 60/00*   (2020.01)

(52) U.S. Cl.
CPC .......... *B60W 30/143* (2013.01); *B60W 60/00* (2020.02); *B60W 2520/10* (2013.01);
(Continued)

(58) Field of Classification Search
None
See application file for complete search history.

(56) References Cited

U.S. PATENT DOCUMENTS 10,166,968 B2 *   1/2019   Kim ..................... B60W 20/12
11,186,276 B2 *   11/2021  Tao ..................... G05D 1/0223
(Continued)

FOREIGN PATENT DOCUMENTS

WO   2016151213 A1   9/2016

OTHER PUBLICATIONS

International Search Report to PCT/FR2022/050106 mailed Jul. 12, 2022.
Written Opinion to PCT/FR2022/050106 mailed Jul. 12, 2022.

*Primary Examiner* — Jonathan M Dager
(74) *Attorney, Agent, or Firm* — Sandberg Phoenix and von Gontard, P.C.

(57) ABSTRACT

The invention relates to a method and a device for determining a deceleration setpoint value of an autonomous vehicle (204), the autonomous vehicle (204) comprising an adaptive cruise control capable of decelerating the autonomous vehicle according to a first deceleration setpoint (215), referred to as standard deceleration, the autonomous vehicle (204) traveling along a first lane (201) at a first speed, the vehicle heading into a second lane (202) subject to a speed limit (208) at a distance, D, relative to the beginning (203) of the second lane (202), said method comprising the steps wherein: —a necessary deceleration is calculated; —the deceleration setpoint of the autonomous vehicle (204) is determined; —the adaptive cruise control applies the deceleration setpoint thus determined in order to decelerate the autonomous vehicle (204) from the beginning (203) of the second lane (202).

7 Claims, 3 Drawing Sheets

(52) U.S. Cl.
CPC ..... *B60W 2552/10* (2020.02); *B60W 2555/60* (2020.02); *B60W 2720/10* (2013.01)

(56) References Cited

U.S. PATENT DOCUMENTS

| | | | |
|---|---|---|---|
| 11,279,359 B2* | 3/2022 | Plianos | B60W 50/14 |
| 11,352,001 B2* | 6/2022 | Kim | G06V 20/584 |
| 11,383,714 B2* | 7/2022 | Horiba | B60W 50/14 |
| 2014/0121928 A1* | 5/2014 | Kurumisawa | B60T 8/1755 |
| | | | 701/70 |
| 2016/0121898 A1* | 5/2016 | Jo | B60W 30/18072 |
| | | | 180/65.21 |
| 2017/0015319 A1* | 1/2017 | Knoller | B60W 50/0097 |
| 2017/0072926 A1* | 3/2017 | Fukuda | B60W 10/06 |
| 2017/0080941 A1* | 3/2017 | Ono | G01C 21/20 |
| 2018/0029609 A1* | 2/2018 | Knoller | B60W 30/146 |
| 2018/0345948 A1* | 12/2018 | Ulrich | B60W 30/146 |
| 2018/0345963 A1* | 12/2018 | Maura | G05D 1/0212 |
| 2018/0370527 A1* | 12/2018 | Rachor | B60W 30/16 |
| 2019/0126928 A1* | 5/2019 | Sakaguchi | B60W 10/06 |
| 2019/0317522 A1* | 10/2019 | Yang | G05D 1/0278 |
| 2019/0337514 A1* | 11/2019 | Natsumi | B60W 30/12 |
| 2019/0367032 A1* | 12/2019 | Ito | B60W 50/00 |
| 2020/0207354 A1* | 7/2020 | Ishioka | B60W 10/20 |
| 2020/0269844 A1* | 8/2020 | Ishioka | B60W 10/20 |
| 2020/0361489 A1* | 11/2020 | Park | B60W 30/0956 |
| 2020/0391747 A1* | 12/2020 | Ohmura | B60W 30/09 |
| 2021/0197858 A1* | 7/2021 | Zhang | G08G 1/161 |
| 2021/0261127 A1* | 8/2021 | Lechner | B60K 31/0066 |
| 2021/0276588 A1* | 9/2021 | Kabzan | G05D 1/0088 |
| 2022/0161655 A1* | 5/2022 | Yeo | G01C 21/34 |
| 2022/0212665 A1* | 7/2022 | Tanaka | B60W 60/00 |
| 2022/0219692 A1* | 7/2022 | Taniguchi | B60W 30/12 |
| 2022/0297671 A1* | 9/2022 | Okita | B60W 30/16 |

* cited by examiner

[Fig. 1]
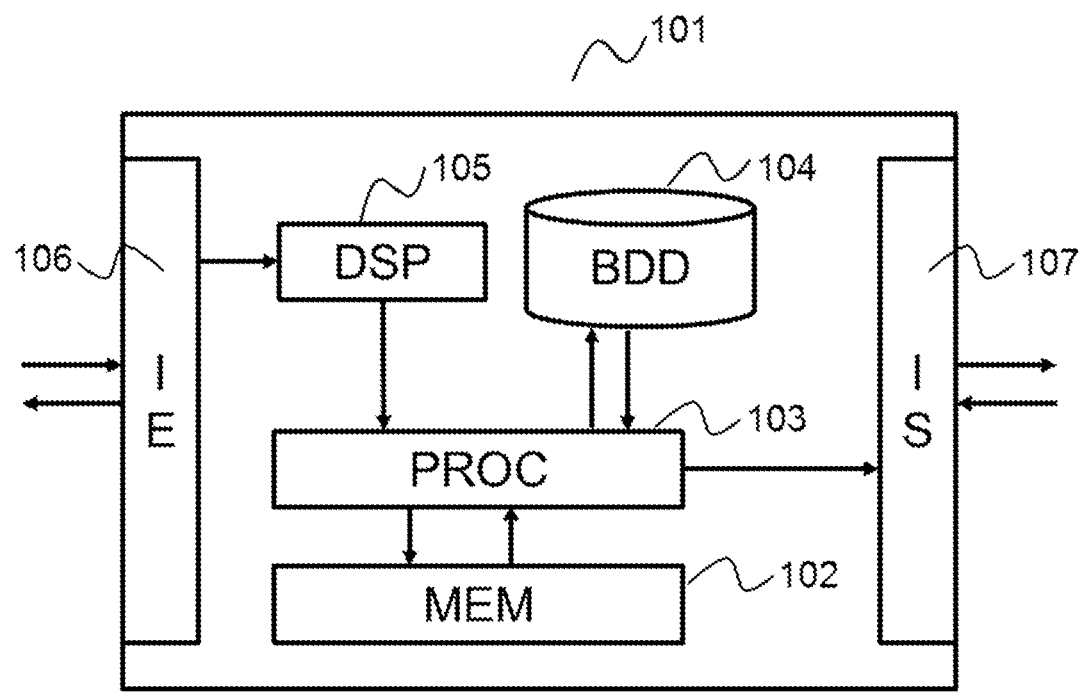

[Fig. 2]
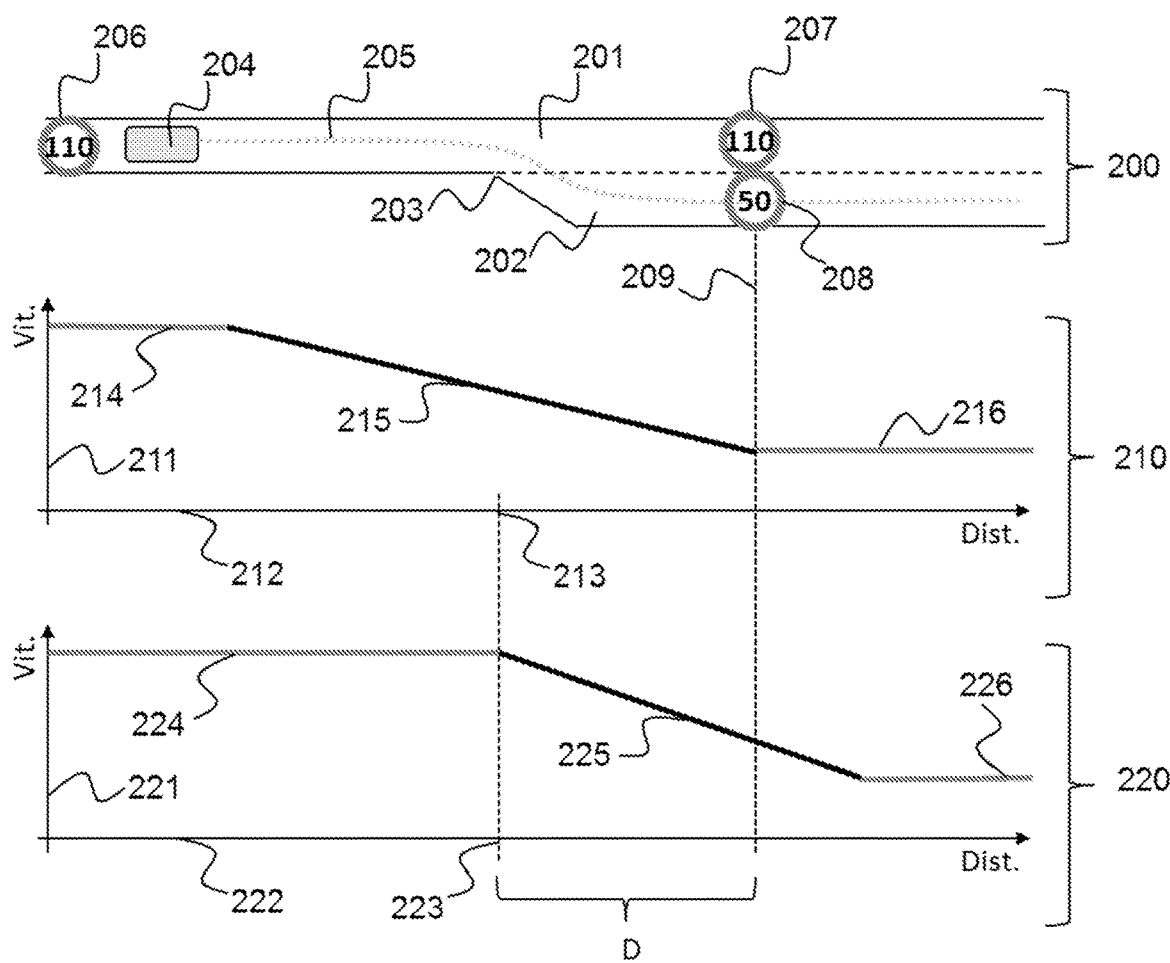

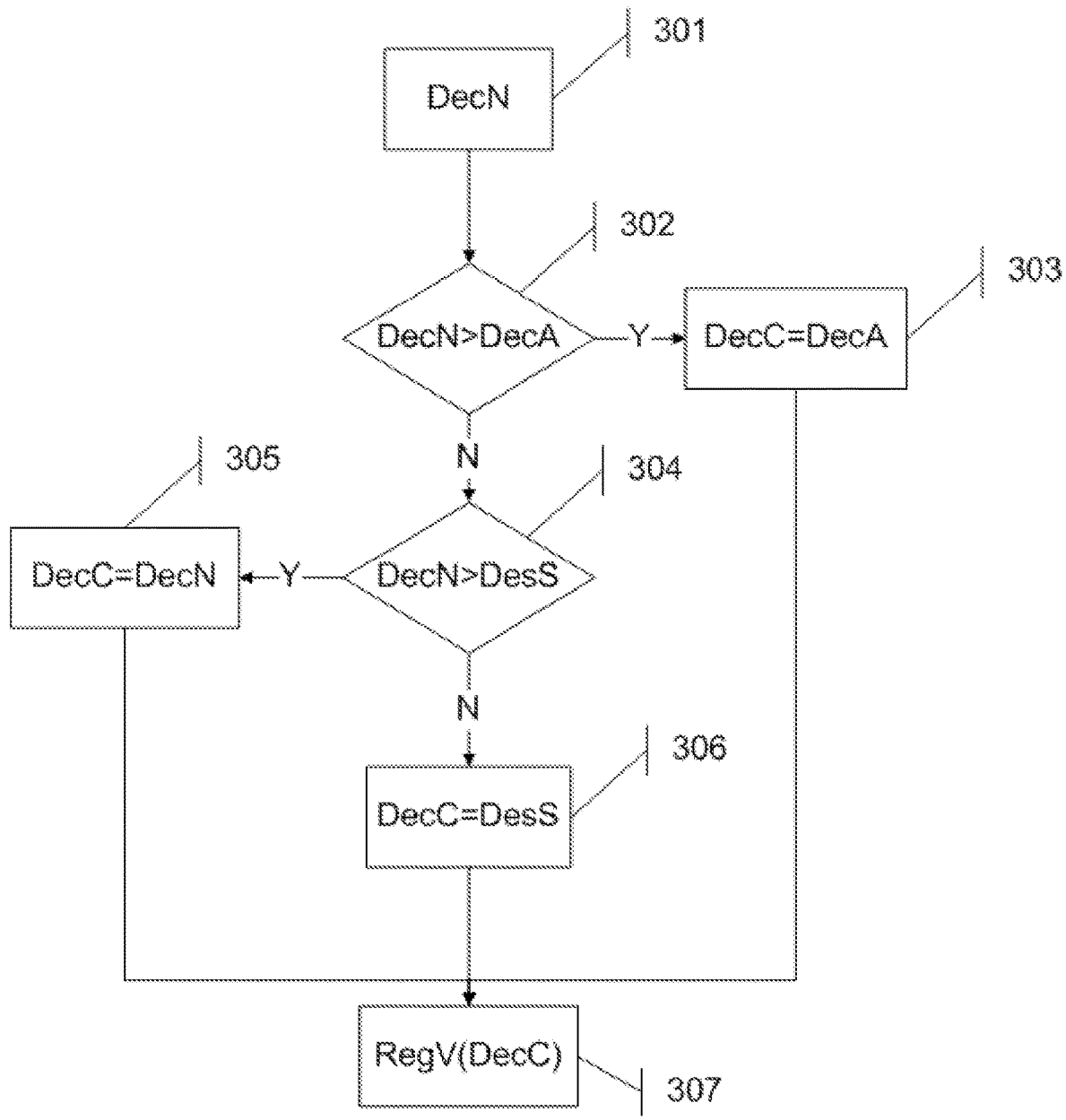
[Fig. 3]

METHOD AND DEVICE FOR DETERMINING A DECELERATION SETPOINT VALUE OF AN AUTONOMOUS VEHICLE

CROSS-REFERENCE TO RELATED APPLICATIONS

This application is the US National Stage under 35 USC § 371 of International Application No. PCT/FR2022/050106, filed Jan. 20, 2022, which claims the priority of French application 2101722 filed on Feb. 23, 2021, the content (text, drawings and claims) of both said applications being incorporated by reference herein.

BACKGROUND

The devices and methods described herein belong to the field of autonomous vehicle driving assistance systems. In particular, a method and device for determining a deceleration setpoint value of an autonomous vehicle are described, the autonomous vehicle comprising an adaptive cruise control capable of decelerating the autonomous vehicle.

"Vehicle" is understood to mean any type of vehicle such as a motor vehicle, a moped, a motorcycle, a storage robot in a warehouse, etc. "Autonomous driving" of an "autonomous vehicle" is understood to mean any method capable of assisting with the driving of the vehicle. The method can thus consist of partially or totally directing the vehicle or of providing any type of assistance to a physical person driving the vehicle. The method thus covers all types of autonomous driving, from level 0 to level 5 in the scale of the International Organization of Motor Vehicle Manufacturers (OICA).

An adaptive cruise control is a system that contributes to autonomous driving. The vehicle's speed is controlled in particular from a speed and/or acceleration setpoint that depends on the external environment and on the route that the vehicle will follow. A deceleration is of the opposite sign to an acceleration. In the event of braking, the vehicle speed decreases, the acceleration is negative and the deceleration is positive.

This control takes into account an inter-distance between the vehicle and a vehicle preceding it, a speed limit, a road geometry, etc. The speed limit information is obtained in advance, conventionally by a navigation system and/or by recognition of speed limit signs from an on-board camera. Thus, in the case of recognition of a future decrease in the speed limit, the adaptive cruise control decelerates the vehicle constantly as a function of time in the order of 0.7 m/s$^2$; this deceleration is said to be standard deceleration.

When the vehicle is traveling on a first lane, for example a fast lane, and must change lanes to arrive at a second lane, for example an exit lane, with a lower speed limit than that of the fast lane, the speed limit being located at a distance D from the start of the second lane, then the adaptive cruise control system decelerates according to the standard deceleration in order to be able to comply with the lower speed limit when the vehicle will be at the lower speed limit In certain situations, such as, for example, when there is a large difference in speed between the speed of the vehicle on the fast lane and the lower speed limit and/or when the distance D is small, the vehicle must very greatly reduce its speed in the fast lane, which leads to dangerous situations.

SUMMARY

One object is to remedy the aforementioned problem, in particular to adopt a particular strategy to avoid excessively decelerating the vehicle when it is traveling in the first lane.

To this end, a first aspect relates to a method for determining a deceleration setpoint value for an autonomous vehicle, the autonomous vehicle comprising an adaptive cruise control capable of decelerating the autonomous vehicle according to a first deceleration setpoint, referred to as standard deceleration, the autonomous vehicle traveling along a first lane at a first speed, the vehicle heading into a second lane subject to a speed limit at a distance, D, relative to the beginning of the second lane, said method comprising the steps wherein:

A necessary deceleration is calculated, referred to as calculated deceleration, to decelerate the autonomous vehicle, over the distance D, from the first speed to a second speed, the second speed being greater than or equal to the speed limit of the second lane;

The deceleration setpoint of the autonomous vehicle is determined
  If the calculated deceleration is greater than a supported threshold, the supported threshold being greater than the standard deceleration, then the deceleration setpoint value of the autonomous vehicle is equal to the supported threshold;
  Otherwise, if the calculated deceleration is greater than the standard deceleration, then the deceleration setpoint value of the autonomous vehicle is equal to the calculated deceleration;
  Otherwise, the deceleration setpoint value is equal to the standard deceleration;

The adaptive cruise control applies the deceleration setpoint thus determined in order to decelerate the autonomous vehicle from the beginning of the second lane.

Thus, the autonomous vehicle is not decelerated when it is traveling along the first lane. Depending on the deceleration needed, the autonomous vehicle is decelerated more strongly beyond the standard deceleration than with conventional adaptive cruise control systems. The deceleration cannot be higher than a supported threshold. This causes the controlled speed of the autonomous vehicle traveling in the second lane to be, in certain cases, greater than the speed limit for a short distance.

Thus, this operating mode leads to a behavior similar to a natural behavior of a driver who actively decelerates a vehicle that they are driving, in the absence of an adaptive cruise control.

Advantageously, if the calculated deceleration is greater than the standard deceleration, the method further comprises the steps wherein:

a preventive deceleration setpoint value of the autonomous vehicle is determined, the preventive deceleration setpoint value being applied by the adaptive cruise control when the vehicle is traveling along the first lane to decelerate the autonomous vehicle from the first speed to a third speed;

a new deceleration necessary to decelerate the autonomous vehicle, over the distance D, from the third speed to the second speed, is calculated;

A new deceleration setpoint of the autonomous vehicle is determined
  If the new calculated deceleration is greater than a supported threshold, the supported threshold being greater than the standard deceleration, then the new deceleration setpoint value of the autonomous vehicle is equal to the supported threshold;
  Otherwise, if the new calculated deceleration is greater than the standard deceleration, then the deceleration setpoint value of the autonomous vehicle is equal to the calculated deceleration;

The adaptive cruise control applies the new deceleration setpoint thus determined in order to decelerate the autonomous vehicle from the beginning of the second lane.

Thus, the autonomous vehicle is decelerated in the first lane according to a first deceleration profile, and is decelerated in the second lane according to a second deceleration profile. As the occupants of the autonomous vehicle can sense the deceleration in the first lane, they feel reassured that the lane change is being handled properly.

Advantageously, the third speed is a speed lower than a speed limit in the first lane, a speed lower than the first speed, or a speed at the start of the second lane such that the new calculated deceleration is less than or equal to the supported threshold.

Thus, the method makes it possible to decelerate the autonomous vehicle in the first lane with a deceleration lower than the standard deceleration. On the other hand, the deceleration in the second lane becomes less pronounced, and therefore more comfortable.

Advantageously, the second speed is equal to the speed limit of the second lane increased by a predetermined speed and/or multiplied by a predetermined coefficient, the second speed then being higher than the speed limit.

Thus, this causes the controlled speed of the autonomous vehicle traveling in the second lane to be greater than the speed limit for a short distance when a standard deceleration is not possible.

Advantageously, the standard deceleration, the preventive deceleration and the supported threshold are between 0 and 10 m/s$^2$.

For example, without being limiting, the standard deceleration is 0.7 m/s$^2$, the preventive deceleration is 0.3 m/s$^2$, and the supported threshold is 2 m/s$^2$, A second aspect relates to a device comprising a memory unit associated with at least one processor configured to implement the method according to the first aspect.

Also described herein is a vehicle including the device.

Also described herein is a computer program comprising instructions suitable for executing the steps of the method, according to the first aspect, when said program is executed by at least one processor.

BRIEF DESCRIPTION OF THE FIGURES

Other features and advantages will become apparent from the description of the non-limiting embodiments below, with reference to the appended figures, in which:

FIG. 1 schematically shows a device according to a particular embodiment.

FIG. 2 schematically shows the deceleration of a vehicle according to the prior art.

FIG. 3 schematically shows a method for determining a deceleration setpoint value of an autonomous vehicle according to a particular embodiment.

DETAILED DESCRIPTION

The methods and devices are described below in their non-limiting application to the case of an autonomous motor vehicle circulating on a road or on a traffic lane. Other applications such as a robot in a storage warehouse or else a motorcycle on a country road are also conceivable.

FIG. 1 depicts an example of a device 101 in the vehicle, in a network ("cloud") or in a server. This device 101 can be used as a centralized device in charge of at least some steps of the method described below with reference to FIG. 2. In one embodiment, it corresponds to an autonomous driving computer.

The device 101 is in the vehicle.

This device 101 may take the form of a housing comprising printed circuit boards, any type of computer or else a mobile telephone (smartphone).

The device 101 comprises a random-access memory 102 for storing instructions for the implementation by a processor 103 of at least one step of the method as described hereinbefore. The device also comprises mass storage 104 for storing data that are intended to be kept after the implementation of the method.

The device 101 may further comprise a digital signal processor (DSP) 105. This DSP 105 receives data for shaping, demodulating and amplifying these data in a manner known per se.

The device 101 also comprises an input interface 106 for receiving the data implemented by the method and an output interface 107 for transmitting the data implemented by the method.

In particular, the device 101 receives the following data: positions, acceleration speeds, and vehicle routes; road maps; position and value of the speed limits of the road on which the vehicle is traveling and routes on which the vehicle will travel; positions, speeds and accelerations of the other vehicles traveling on the road, etc.

In the context of an autonomous vehicle, these data are conventionally obtained by: processing images acquired by cameras; a navigation system associated with a geolocation system and maps, communication systems whether vehicle-to-vehicle (V2V), vehicle-to-infrastructure (V2I) or other (V2X); radar and/or lidar; the powertrain, steering and/or braking system of the vehicle; etc.

In one embodiment, the device 101 transmits to the systems cited above, through its output interface, a vehicle deceleration setpoint value determination.

FIG. 2 schematically shows the deceleration of a vehicle according to the prior art. The Figure is divided into 3 parts: a first part 200 representing a road seen from overhead, a second part 210 representing a speed of a vehicle decelerating according to the prior art, and a third part 220 representing a speed of a vehicle decelerating according to a particular example embodiment.

The road 200 comprises a first lane 201 and a second lane 202 adjacent to the first lane 201. The second lane is located to the left or to the right of the first lane. The start of the second lane 202 is represented by 203. It is not necessary for the second lane 202 to adjoin the first lane 201 along its entire length. For example, the first lane 201 is a fast lane and the second lane 202 is an exit lane.

A vehicle 204 is traveling on the road 200. The planned route that the vehicle is to follow is shown by a dotted line 205. The vehicle is traveling in the first lane 201 and will thereafter switch to the lane 202. For example, the route is derived from a navigation system associated with a geolocation system and a map. The map comprises at least one representation of the road as well as local speed limits. Other systems are able to recover local speed limits. These systems are, for example, an embedded camera with image recognition such as recognition of road signs, vehicle-to-vehicle or vehicle-to-infrastructure communication, etc.

The first lane comprises a first speed limit represented by 206 and 207. The second lane 202 comprises a second speed limit 208. The second speed limit begins at the line 209.

On the part 210 of the figure, a marker represents the speed of the vehicle 204, along the axis 211, as a function of the distance, along the axis 212. The line 213 indicates the start 203 of the second lane 202 on the axis 212 of the distance. The line 209 indicates the start of the second speed limit 208 on the axis 212 of the distance.

The vehicle speed 204 along the route 205 is represented by three segments. The first segment 214 represents a first speed, a speed of the vehicle 204 traveling in the first lane before decelerating, according to a deceleration represented by the second segment 215, to reach the second speed limit 208, represented by the segment 216.

In the prior art, the vehicle decelerates according to a first deceleration setpoint, referred to as a standard deceleration. A standard deceleration is on the order of 0.7 m/$^2$. An adaptive cruise control regulates the speed of the vehicle 204 according to the first deceleration setpoint. In certain situations, knowing the speed to be reached, knowing the first deceleration setpoint, the vehicle 204 begins to decelerate in the first lane 205. This causes dangerous situations when the vehicle speed 204 is either much lower than the first speed limit, or when it decreases very early relative to the start 203 of the second lane 202.

On the part 220 of the figure, a marker represents the speed of the vehicle 204, along the axis 221, as a function of the distance, along the axis 222. The line 223 indicates the start 203 of the second lane 202 on the axis 222 of the distance. The line 209 indicates the start of the second speed limit 208 on the axis 222 of the distance. The difference between the start 203 of the second lane 202 and the start of the second speed limit 208 is a distance denoted D.

The vehicle speed 204 along the route 205 is represented by three new segments. The first segment 224 represents a first speed, a speed of the vehicle 204 traveling in the first lane before decelerating, according to a deceleration represented by the second segment 225, to reach the second speed limit 208, represented by the segment 226.

The deceleration 225 is steeper than the standard deceleration 215. The deceleration is stronger in the use case described in the third part 220. In the use case described in the third part 220, the deceleration is stronger (therefore greater, more positive) than the deceleration described in the use case of the second part 210. Likewise, in the use case described in the third part 220, the deceleration is lower (therefore smaller, more negative) than the acceleration described in the use case of the second part 210.

The vehicle speed 204 at location 209 of the second speed limit 208 is greater than the second speed limit 208. There is no deceleration in the first lane.

FIG. 3 schematically shows a method for determining a deceleration setpoint value of an autonomous vehicle, according to a particular embodiment.

Step 301, DecN, is a step of calculating a necessary deceleration, called the calculated deceleration, to decelerate the autonomous vehicle, over the distance D, from the first speed to a second speed, the second speed being greater than or equal to the speed limit of the second lane.

For example, the calculated deceleration, $\gamma_c$ is equal to $\gamma_c = V_1^2 - V_2^2/2*D$, where $V_1$ is the first speed, $V_2$ is the second speed, and D is the distance. The calculated deceleration is positive when $V_1 > V_2$.

According to a design choice, a choice of the vehicle user, a regulation, etc., for example, the second speed is equal to the second speed limit, is equal to the second speed limit plus a predefined value, 5 km/h for example, or is equal to a predefined coefficient that multiplies the second speed limit by 1.05 for example to add 5% to the second speed limit. The second speed may also be a combination of the last two examples above.

Steps 302 to 306 are an example of the step of determining the deceleration setpoint value of the autonomous vehicle.

Step 302, DecN>DecA, is the step where the calculated deceleration is tested to see whether it is greater than a supported threshold, the supported threshold being greater than the standard deceleration. For example, a standard deceleration is on the order of 0.7 m/s$^2$ and a supported threshold, which therefore corresponds to a supported deceleration, is on the order of 2 m/s$^2$.

In the affirmative, the method moves to step 303, DeC=DecA, the deceleration setpoint value of the autonomous vehicle is then equal to the supported threshold.

Step 304, DecN>DeS, is the step where the calculated deceleration is tested to see whether it is greater than the standard deceleration.

In the affirmative, the method moves to step 305, DeC=DecN, the deceleration setpoint value of the autonomous vehicle is then equal to the calculated deceleration.

Next comes step 306, DecC=DesS, where the deceleration setpoint value is equal to the standard deceleration.

Step 307, Reg(DecC), is the step in which the adaptive cruise control applies the determined deceleration setpoint value in order to decelerate the autonomous vehicle from the beginning of the second lane.

Advantageously, in step 301, the second speed is first equal to the second speed limit. If the calculated deceleration is greater than the standard deceleration, then step 301 is restarted with a second speed strictly greater than the second speed limit, according to the procedures already described.

Advantageously, if the calculated deceleration is greater than the standard deceleration, the method further comprises the steps wherein:

a preventive deceleration setpoint value of the autonomous vehicle is determined, the preventive deceleration setpoint value being applied by the adaptive cruise control when the vehicle is traveling along the first lane to decelerate the autonomous vehicle from the first speed to a third speed;

a new deceleration necessary to decelerate the autonomous vehicle, over the distance D, from the third speed to the second, is calculated;

A new deceleration setpoint of the autonomous vehicle is determined

If the new calculated deceleration is greater than a supported threshold, the supported threshold being greater than the standard deceleration, then the new deceleration setpoint value of the autonomous vehicle is equal to the supported threshold;

Otherwise, if the new calculated deceleration is greater than the standard deceleration, then the deceleration setpoint value of the autonomous vehicle is equal to the calculated deceleration;

The adaptive cruise control applies the new deceleration setpoint thus determined in order to decelerate the autonomous vehicle from the beginning of the second lane.

Thus, instead of moving directly from step 303, or from step 305, to step 307, a preventive deceleration setpoint value and a new deceleration setpoint value are calculated. The vehicle is decelerated at the second speed in two stages.

In a first stage, the preventive deceleration setpoint value is calculated. This deceleration is applied by the cruise control when the vehicle is traveling in the first lane. The vehicle is then decelerated from the first speed at a third speed.

Advantageously, the third speed is a speed lower than a speed limit in the first lane, a speed lower than the first speed, or a speed at the start of the second lane such that the new calculated deceleration is less than or equal to the supported threshold.

For example, the third speed is equal to 90% of the speed limit of the first lane, or is equal to 90% of the first speed, or is equal to the speed limit of the first lane minus 10 km/h, or is equal to the first speed reduced by 10 km/h, etc. In another example, the preventive deceleration setpoint value is of the order of 0.3 m/s², or is a function of the distance D and the deviation between the first speed and the second speed.

Secondly, a new deceleration setpoint value is determined as a function of the third speed and of the second speed. The vehicle is then decelerated from the third speed at the second speed, the adaptive cruise control having received a new deceleration setpoint value.

Advantageously, the second speed is equal to the speed limit of the second lane increased by a predetermined speed and/or multiplied by a predetermined coefficient, the second speed then being higher than the speed limit.

For example, the second speed is equal to the second speed limit plus a predefined value, 5 km/h for example, or is equal to a predefined coefficient that multiplies the second speed limit, 1.05 for example to add 5% to the second speed limit. The second speed may also be a combination of the last two examples above.

One embodiment has been described above. Other embodiments are possible.

Thus, an embodiment is described above in which a deceleration setpoint value is a function of the distance D, the distance between the start of the second lane and the start of the second speed limit. In another operating mode, the start of the distance D is downstream or upstream of the start of the second lane. In another operating mode, the end of the distance is downstream or upstream of the start of the second speed limit.

A mathematical expression was given above, by way of example, to calculate the calculated acceleration, $\gamma_c$. The calculation of the calculated acceleration is not limited to this expression. The calculation of the calculated acceleration is achievable by other mathematically equivalent expressions.

The invention claimed is:

1. A method for determining a deceleration setpoint value of an autonomous vehicle, the autonomous vehicle comprising an adaptive cruise control capable of decelerating the autonomous vehicle according to a first deceleration setpoint, referred to as standard deceleration, the autonomous vehicle traveling along a first lane at a first speed, the vehicle heading into a second lane subject to a speed limit (208) at a distance, D, relative to the beginning of the second lane, said method comprising the steps wherein:

A necessary deceleration is calculated, referred to as calculated deceleration, to decelerate the autonomous vehicle, over the distance D, from the first speed to a second speed, the second speed being greater than or equal to the speed limit of the second lane;

The deceleration setpoint of the autonomous vehicle is determined such that:

If the calculated deceleration is greater than a supported threshold, the supported threshold being greater than the standard deceleration, then the deceleration setpoint value of the autonomous vehicle is equal to the supported threshold;

Otherwise, if the calculated deceleration is greater than the standard deceleration, then the deceleration setpoint value of the autonomous vehicle is equal to the calculated deceleration;

Otherwise, the deceleration setpoint value is equal to the standard deceleration;

The adaptive cruise control applies the deceleration setpoint thus determined in order to decelerate the autonomous vehicle from the beginning of the second lane, wherein, if the calculated deceleration is greater than the standard deceleration, the method further comprises the steps wherein:

a preventive deceleration setpoint value of the autonomous vehicle is determined, the preventive deceleration setpoint value being applied by the adaptive cruise control when the autonomous vehicle is traveling along the first lane to decelerate the autonomous vehicle from the first speed to a third speed;

a new deceleration necessary to decelerate the autonomous vehicle, over the distance D, from the third speed to the second speed, is calculated;

a new deceleration setpoint of the autonomous vehicle is determined such that:

If the new calculated deceleration is greater than a supported threshold, the supported threshold being greater than the standard deceleration, then the new deceleration setpoint value of the autonomous vehicle is equal to the supported threshold;

Otherwise, if the new calculated deceleration is greater than the standard deceleration, then the deceleration setpoint value of the autonomous vehicle is equal to the calculated deceleration;

The adaptive cruise control applies the new deceleration setpoint thus determined in order to decelerate the autonomous vehicle from the beginning of the second lane.

2. The method according to claim 1, wherein the third speed is a speed lower than a speed limit in the first lane, a speed lower than the first speed, or a speed at the start of the second lane such that the new calculated deceleration is less than or equal to the supported threshold.

3. The method according to claim 1, wherein the second speed is equal to the speed limit of the second lane increased by a predetermined speed and/or multiplied by a predetermined coefficient, the second speed then being higher than the speed limit.

4. The method according to claim 1, wherein the standard deceleration, the preventive deceleration and the supported threshold are between 0 and 10 m/s².

5. A device comprising a memory associated with at least one processor configured to perform the method according to claim 1.

6. A vehicle comprising the device according to claim 5.

7. A computer program comprising instructions suitable for executing the steps of the method according to claim 1 when said program is executed by at least one processor.

* * * * *